United States Patent [19]
Dow et al.

[11] 3,956,050
[45] May 11, 1976

[54] VACUUM PRESSURE MOLDING TECHNIQUE

[75] Inventors: Marvin B. Dow; Harold G. Bush, both of Newport News; William M. Haraway, Jr., Hampton, all of Va.; John F. Crumpler, deceased, late of Hampton, Va., by Doris L. Crumpler, beneficiary

[73] Assignee: The United States of America as represented by the United States National Aeronautics and Space Administration, Washington, D.C.

[22] Filed: Jan. 24, 1974

[21] Appl. No.: 436,317

[52] U.S. Cl............................. 156/242; 156/286; 264/102; 264/267; 428/117
[51] Int. Cl.² ...................... B32B 3/12; B64G 1/30
[58] Field of Search .......... 156/242, 286, 294, 285, 156/280, 278; 264/101, 102, 267, 268, DIG. 78, 109, 71; 161/68; 428/117

[56] References Cited
UNITED STATES PATENTS

| | | | |
|---|---|---|---|
| 2,744,042 | 5/1956 | Pace | 161/68 |
| 3,425,885 | 2/1969 | Webb | 156/242 |
| 3,585,100 | 6/1971 | Greenless | 264/71 |

*Primary Examiner*—William A. Powell
*Assistant Examiner*—Michael W. Ball
*Attorney, Agent, or Firm*—Howard J. Osborn; Wallace J. Nelson; John R. Manning

[57] ABSTRACT

A method for molding a silicone elastomer into a fiberglass honeycomb panel previously bonded to a face sheet panel. The elastomer is introduced into a mold under vacuum to prevent air entrapment, and the bonded honeycomb panel is positioned above the elastomer filled mold and forced into the elastomer for vacuum filling the honeycomb structure.

8 Claims, 4 Drawing Figures

VACUUM PRESSURE MOLDING TECHNIQUE

ORIGIN OF THE INVENTION

The invention described herein was made by employees of the National Aeronautics and Space Administration and may be manufactured and used by or for the Government for governmental purposes without the payment of any royalties thereon or therefor.

BACKGROUND OF THE INVENTION

1. Field of the Invention

The invention relates to a method for molding a silicone elastomer into a fiberglass honeycomb panel in order to fabricate a structure to provide thermal protection for space re-entry vehicles.

2. Description of the Prior Art

Prior art methods of fabricating heat insulation structures of the type described require the filling of each honeycomb cell individually after it has been bonded to a structural support plate. This method generally results in a varying cell to cell density of the material as well as variations in total fill depth. The individual cell filling method is both time consuming and costly and generally requires several filling and X-ray inspection operations in order to obtain a void free structure. When mechanical tamping is utilized to force the ablation composition into the honeycomb cells, the procedure is further restricted since the tamping technique is not applicable to low density or high viscosity ablation formulation. In addition, stresses are developed in the honeycomb cell walls during the filling operation.

Several prior art filling techniques have been developed to simultaneously fill a complete honeycomb structure. U.S. Pat. No. 3,585,100 to Greenlees and U.S. Pat. No. 3,425,885 to Newcomb et al are examples of this simultaneous fill process. Greenlees for example, discloses a method for fabricating a panel structure comprising resin and crushed quartz by pressing the honeycomb structure into the filled mold mixture and then placing the mold in a vacuum chamber and applying heat in order to attain a low viscosity state. Under this method uneven filling and voids may result from air trapped in the honeycomb structure in the mold filling process as well as in the pressure step which forces the honeycomb into the mold mixture. Newcomb teaches a vacuum filling technique of a de-aerated ablative filling material in which the honeycomb structure is held stationary and the ablative material is forced into the honeycomb structure. Ablative materials are, however, pressure load rate sensitive, and forcing such materials at high rates or under large loads results in the imposition of lateral forces on the cell walls of the honeycomb structure, thus tending to shear the bonded honeycomb nodes. These side forces are particularly prevalent in ablation materials in the density range of 10–40 lbs/ft$^3$. In addition, the bonding of the honeycomb panel to a rigid support panel or "face sheet" tends to introduce additional stresses in the cell walls when filling with pressure load rate sensitive materials. Possible honeycomb damage is a major disadvantage in prior art filling techniques for ablative materials, particularly those having a density range between 10–40 lbs/ft$^3$.

SUMMARY OF THE INVENTION

It is an object of the instant invention to overcome the disadvantages of the prior art and to provide a method in which honeycomb cells of complex configuration may be simultaneously and uniformly filled with ablative material.

Another object of the invention is to provide a method of filling honeycomb panels which results in minimum density variation in the filled cells.

Another object of the instant invention is to provide a method of filling honeycomb panels with ablative material so as to provide a void free filling.

Another object of the instant invention is to provide a method of fabricating ablative filled honeycomb structures in which minimum stress is exerted on the cell walls during the filling process.

Another object of the invention is to provide a method for filling honeycomb panels with either high or low density materials.

Yet another object of the invention is to provide a method for filling honeycomb cells with ablative material wherein the ablation compounds need not be heated to achieve a lower viscosity prior to filling.

The essential features of the instant invention comprise a method of filling honeycomb structures in which the honeycomb is introduced into the ablation composition in the absence of atmosphere. The process is termed a "reverse displacement" process in that the honeycomb structure is forced through the ablation composition as opposed to the ablation composition being forced into the honeycomb structure. Since ablative materials are pressure load rate sensitive, the reverse displacement process eliminates the loads on the honeycomb cell nodes which result from conventional filling techniques. The process takes place under vacuum so as to eliminate voids and insure a uniform filling for each cell.

BRIEF DESCRIPTION OF THE DRAWINGS

These and other objects of the invention will become apparent from the following detailed description when read in light of the accompanying drawings in which.

DESCRIPTION OF THE PREFERRED EMBODIMENT

Figure 1:
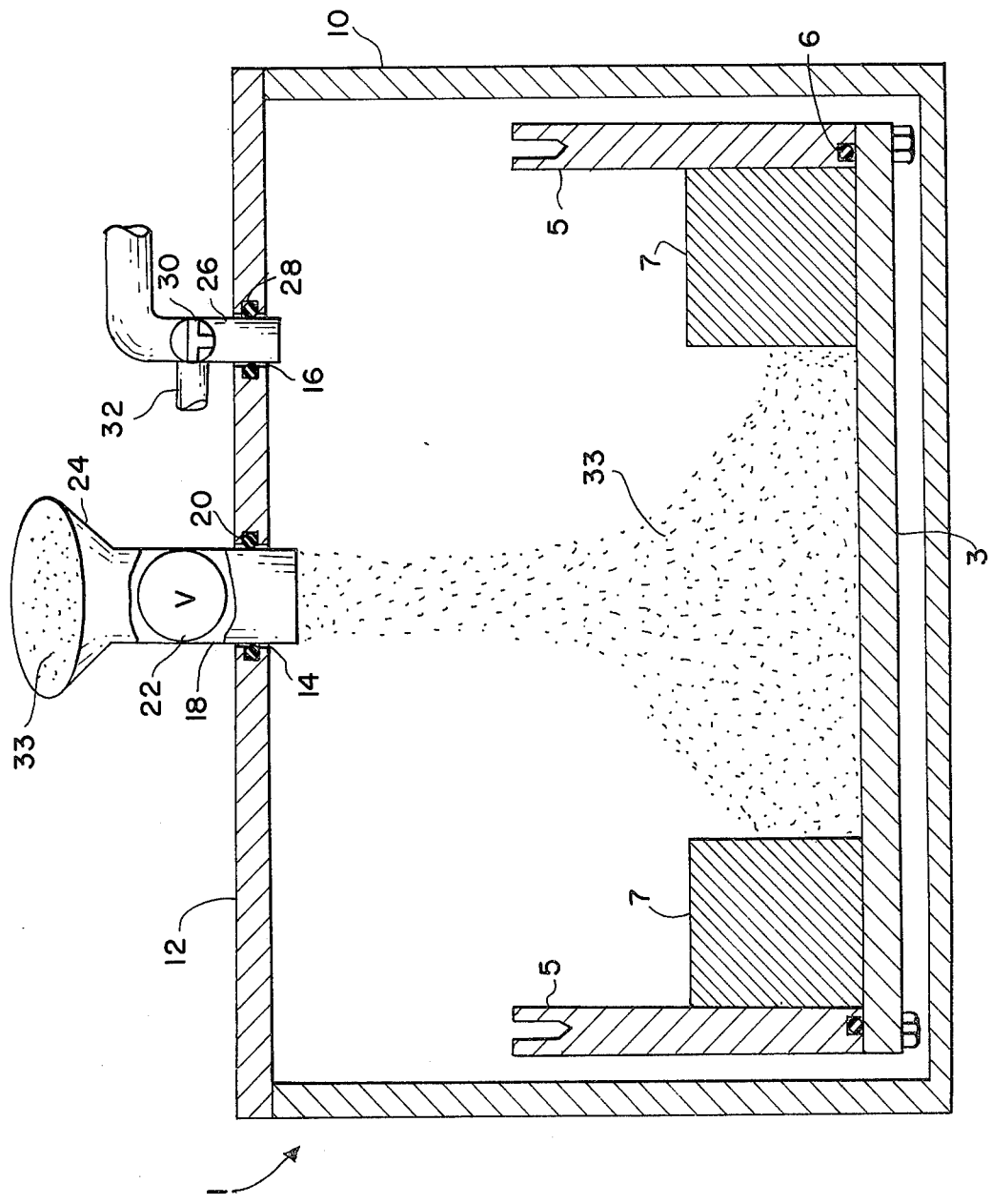
FIG. 1 illustrates a vertical sectional view of the apparatus during the vacuum mold filling process.

FIG. 1 illustrates the basic mold assembly 1 which comprises a circular base plate 3 and cylindrical mold casing 5. The base plate and mold casing juncture contains an O-ring 6 to insure a vacuum seal. The mold assembly 1 contains a shim annulus 7 which is positioned adjacent the mold casing on the base plate 3. The mold assembly is positioned in the center of a vacuum chamber 10 having a lid 12 containing a central aperture 14 and an offset aperture 16. Central aperture 14 receives a material inlet pipe 18 secured by O-ring seal 20. Pipe 18 is connected through a gate valve 22 to a funnel 24. The bottom of material inlet pipe 18 may contain a plurality of apertures or a plurality of individual extrusion ports or tube extensions in order to insure an even flow of ablative material. The offset aperture 16 receives a pipe 26 secured by means of an O-ring seal 28. Pipe 26 is connected to a vacuum pump (not shown) by means of a valve 30. Valve 30 may also be positioned to let air into the vacuum chamber, by means of tube 32, to establish ambient pressure in the chamber.

Prior to placing the mold assembly 1 into the vacuum chamber 10, the mold is cleaned with a solvent such as methyl ethyl ketone and ultrasonically degreased in freon.

The mold assembly and vacuum chamber are such as to permit the material composition 33 to fall through the vacuum chamber a distance of at least 6 inches to insure a proper aeration of the material. Prior to introducing the material 33 via funnel 24, the vacuum chamber 10 is evacuated for approximately 30 minutes and the pressure is reduced to approximately one inch of mercury. The ablative material which may, for example, be a silicone elastomer comprising a mixture of silicone resin (75% by weight), silicone eccospheres (15% by weight) and phenolic microballoons (10% by weight) is introduced into the mold assembly 1 by means of the funnel 24 and inlet pipe 18. The material flow rate may be adjusted by means of viewing the composition through visual ports in the vacuum chamber and mold casing. The flow rate is adjusted in order to permit the highest possible volume of material to clear the extrusion ports before being de-aerated as it falls into the mold assembly. The material is maintained at a constant level in the funnel so as to prevent air leakage into the vacuum system. After the de-aeration cycle and upon filling the mold assembly, the gate valve is closed and the system is evacuated for approximately 25 minutes. Air is then let into the system by means of valve 30 and tube 32 and the vacuum lid 12 is removed.

Figure 2:
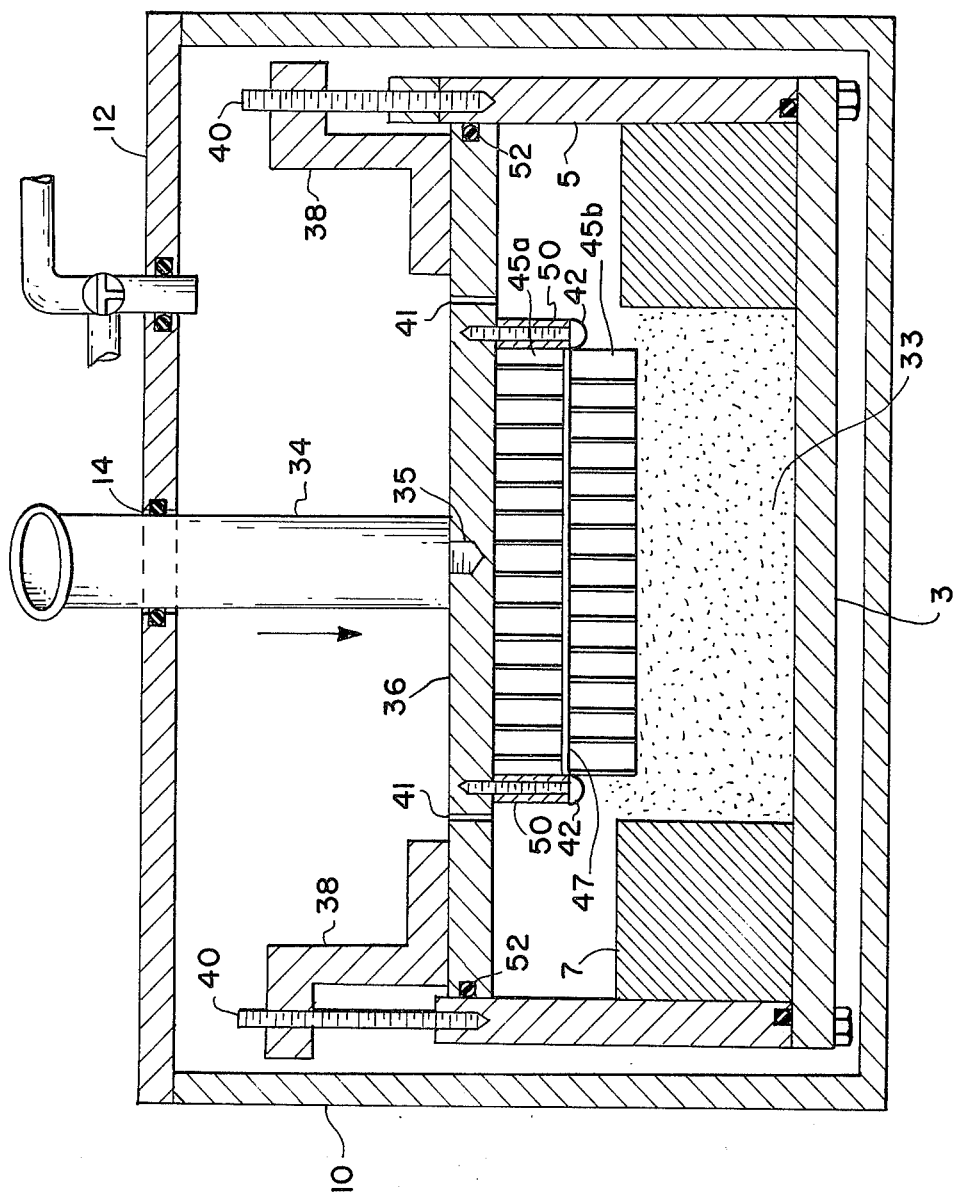
FIG. 2 illustrates a vertical sectional view of the apparatus during the vacuum pressure step for filling the honeycomb panel.

The next step in the procedure is to force a honeycomb structure into the material composition 33. FIG. 2 illustrates a cross-sectional view of the mold assembly and vacuum chamber during the filling process. In FIG. 2, however, the vacuum lid 12 contains a push rod 34 which is secured via screw 35 to a mold plunger 36. Attached to the mold plunger are a plurality of stops 38 which are mounted for sliding vertical motion about guide pins 40. Guide pins 40 are rigidly secured to the mold casing 5. The O-ring 52 maintains a seal between the plunger and the mold casing 5. Apertures 41 through mold plunger 36 allow the filling process to take place under vacuum.

Figure 4:
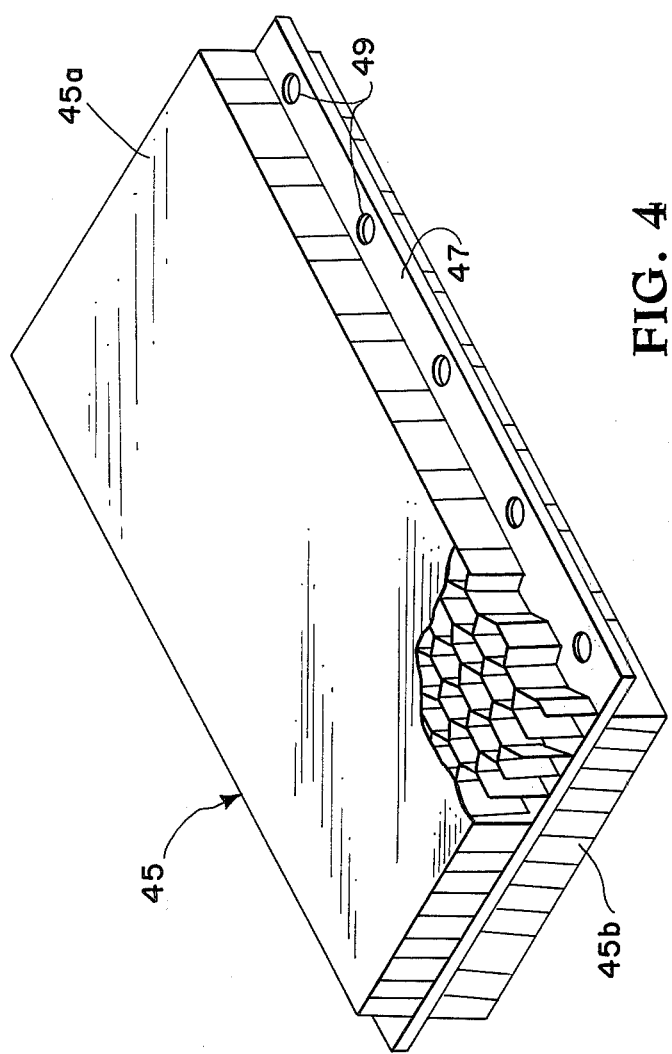
FIG. 4 illustrates a filled honeycomb structure showing a partial cutaway of empty honeycomb cells.

Attached to the mold plunger 36 by means of screws 42 is the honeycomb structure 45. The honeycomb structure is best seen in FIG. 4 and comprises an upper and lower honeycomb panel 45a and 45b. Each panel is bonded to a supporting plate 47 which may be of stainless steel or other material. Screws 42 pass through plate apertures 49 and are spaced from the mold plunger 36 by means of spacers 50. Although the honeycomb structure 45 is shown as a double panel structure having an upper and lower honeycomb panel, it is obvious that the supporting plate 47 could be used to support only a single honeycomb panel which would correspond to the lower panel 45b in FIG. 2.

The filling operation as illustrated in FIG. 2 is designed to force the honeycomb structure 45 into the material composition. The push rod 34 is positioned in the central aperture 14 of the vacuum lid 12. Push rod 34 is then attached to mold plunger 36 and the assembly, together with the stops 38 and guide pin 40 is aligned with respect to the mold assembly 1. The push rod 34 is then clamped in position such that the mold plunger 36 rests within the mold casing housing 5 but several inches above the shim 7. The system is then evacuated to a pressure of approximately one inch of mercury and held at this pressure for about 45 minutes. The clamp holding the push rod is then released and downward pressure is applied to the push rod forcing the mold plunger into the mold casing 5. The pressure forces the honeycomb structure 45 into the material composition and in particular completely fills the lower honeycomb panel 45b with the material 33. The filling under vacuum insures the absence of air pockets within the cells. Maintaining the composition stationary, substantially eliminates side forces in pressure load rate sensitive materials.

Figure 3:
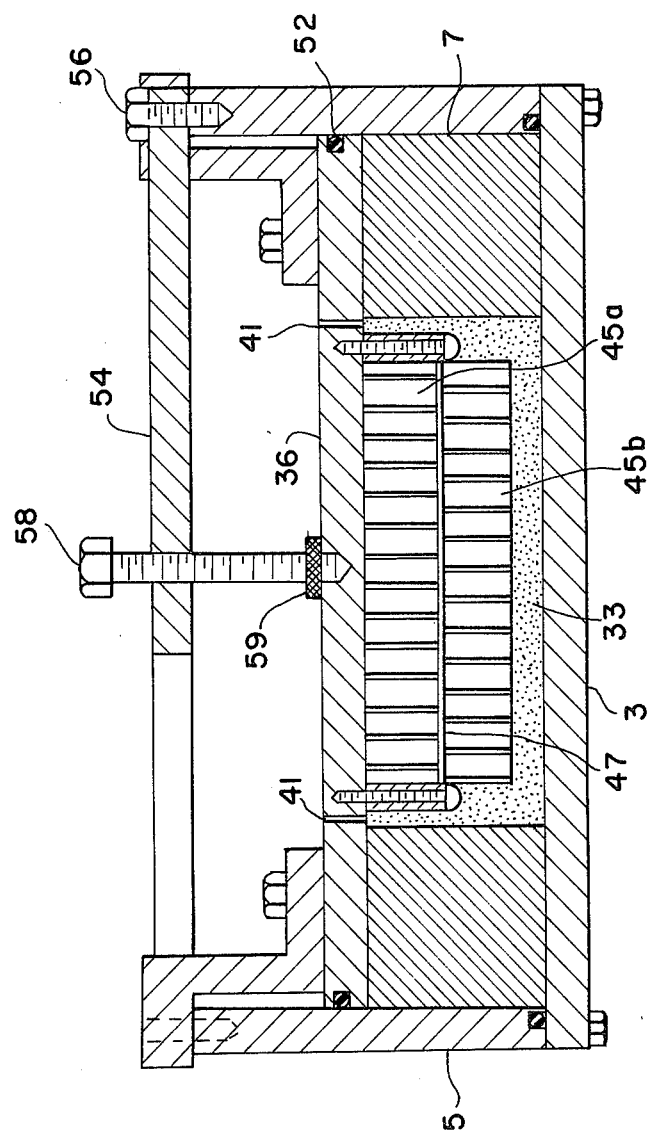
FIG. 3 illustrates a sectional view of the mold during the curing step.

After the honeycomb structure is full, the vacuum is released and the push rod 34 is unscrewed from the mold plunger 36. The vacuum lid 12 is then removed and the mold assembly is removed from the vacuum chamber. The guide pins 40 are removed from the mold casing walls and a top plate 54 as shown in FIG. 3 is positioned over the mold assembly and secured to the mold casing 5 by means of screws 56. A jacking screw 58 is used to maintain pressure against mold plunger 36. The end of jacking screw 58 is provided with a rotatable end cap 59 for contact with mold plunger 36.

The mold assembly 1 may be placed in an air circulating oven to cure the filled honeycomb panel. After curing, the mold assembly is removed from the oven and the honeycomb structure 45 removed from the mold assembly. The mold assembly 45 is then inverted and the procedure repeated to fill the second honeycomb panel.

While the invention has been described with reference to the above disclosure relating to the preferred embodiment, it is understood that numerous modifications or alterations may be made by those of skill in the art without departing from the scope and spirit of the invention as set forth in the claims.

We claim:

1. A method of making a thermal insulating ablation honeycomb structure comprising the steps of:
   a. drawing a vacuum in a mold structure,
   b. filling said mold structure with a pressure load rate sensitive ablation material composition while said mold structure is under vacuum,
   c. forcing said honeycomb structure into said filled mold structure while said mold structure is under vacuum whereby said honeycomb structure is filled with the material composition.

2. A method of making a thermal insulating honeycomb structure as recited in claim 1 further comprising the step of bonding said honeycomb structure to a support member before forcing said honeycomb into said filled mold structure.

3. A method of making a thermal insulating honeycomb structure as recited in claim 1 further comprising the step of de-aerating said material composition during the mold filling step.

4. A method of making a thermal insulating honeycomb structure as recited in claim 1 wherein said material composition comprises a silicone resin.

5. A method of making a thermal insulating honeycomb structure as recited in claim 1 further comprising the steps of:
   withdrawing said filled honeycomb structure from said mold structure, and
   curing the filled honeycomb structure.

6. A method of making a thermal insulating honeycomb structure as recited in claim 3 wherein said material composition is de-aerated by passing said material composition through a vacuum during said mold filling step.

7. A method of making a thermal insulating honeycomb structure as recited in claim 6 wherein said material composition falls through vacuum a distance of at least 6 inches.

8. A method of making a thermal insulating honeycomb structure as recited in claim 7 wherein said material composition has a density range of 10 –40 pounds per cubic foot.

* * * * *